United States Patent Office 2,784,052
Patented Mar. 5, 1957

2,784,052

PROCESS OF PREPARING WATERPROOF FILMS, FABRICS, FILAMENTS, AND YARNS OF REGENERATED CELLULOSE CONTAINING WITHIN A WATERPROOF ADDITION POLYMER AND PRODUCTS PRODUCED THEREFROM

Henning W. Jacobson, Wilmington, Del., assignor to E. I. du Pont de Nemours and Company, Wilmington, Del., a corporation of Delaware No Drawing. Application April 23, 1954,
Serial No. 425,323

14 Claims. (Cl. 8—130)

This invention relates to modified, regenerated cellulose and more particularly to waterproof regenerated cellulose/hydrophobic vinylidene polymer blends wherein the latter component is substantially completely inextractable.

Cellulose in both native and regenerated form has long occupied an important position in the film and fiber field because of its wide spectrum of desirable physical and esthetic properties and especially because of its ready and wide availability at relatively low cost. Probably the most important of the properties of cellulose is its reasonably good hydrophilicity, i. e., water absorption and subsequent swelling, which permits processing into the desired shapes and forms with cheap, safe aqueous systems. While this property is desirable in fabric, fiber, and film processing, it is obviously undesirable in not permitting the preparation of such shaped objects from cellulose which serve as protective barriers against water. Such products are of great demand in many fields, such as in protective clothing, e. g., raincoats and the like; as waterproof film for packaging, e. g., in the frozen food industry; in many marine outlets, e. g., tarpaulins; and the like.

Attempts have been made to modify both native and regenerated cellulose so as to make it waterproof without losing its other desirable properties. Moderate success has been achieved in the preparation of adequate water repellent garments which exhibit essentially unchanged physical and esthetic properties by impregnation or coating of cellulose fibers or fabrics with monomeric or polymeric materials which are resistant to water. However, such products are not waterproof, i. e., appreciable amounts of liquid water are throughput on physical contact. Heavier coatings of waterproof polymers have also been achieved and the thus modified products are waterproof; however, all such products exhibit largely the physical and esthetic properties of the modifying polymer rather than the desirable ones of cellulose.

This invention has as an object substantially completely waterproof shaped objects of regenerated cellulose with the desirable physical and esthetic properties of unmodified cellulose, wherein the phrase "shaped objects" is primarily intended to include as in normal usage those objects having one dimension very large with respect to at least one other, i. e., fibers, fabrics, and films. Another object is a waterproof cellulose shaped object having the hand and feel of cellulose. A further object is the provision of processes for attaining the above objects. Other objects will appear hereinafter.

These objects are accomplished by the present invention wherein a shaped object of an intimate mixture of a cellulose ester of a 1–6 carbon alkanoic acid and from 20 to 200%, by weight of the cellulose of the cellulose ester, of a waterproof polymer, said polymer being predominantly within, i. e., internal to, the cellulose ester in the shaped object, is exposed to saponification conditions until the cellulose ester is substantially completely saponified to cellulose, said polymer remaining essentially unchanged, and the resultant shaped object is treated with a solvent for the waterproof polymer which is a nonsolvent for the regenerated cellulose.

The new products of the present invention are substantially completely waterproof shaped objects of modified cellulose regenerated from a cellulose ester of a 1–6 carbon alkanoic acid which surprisingly exhibit substantially the same—in some instances even slightly improved—desirable physical and esthetic properties as unmodified cellulose or unmodified regenerated cellulose. These new products contain from as little as 20% to as much as 200%, based on the cellulose, of a waterproof addition polymer, non-saponifiable under the mild regeneration conditions used in regenerating the cellulose and so distributed that the great majority of the polymer is wholly internally deposited within the cellulose and substantially completely inextractable therefrom, with the remaining minor proportion of the addition polymer distributed in a thin layer over the great majority of the surface of the regenerated cellulose, the polymer on the surface being likewise inextractable from the regenerated cellulose composition. The minor amount of surface waterproof addition polymer substantially completely encapsulates or sheaths the surface of the regenerated cellulose and yet is substantially completely inextractable, due probably to linkage through addition polymer chains to the greater proportion of the addition polymer which is completely internally deposited within the structure of the regenerated cellulose shaped object.

The waterproof addition polymer can be supplied either per se or in monomer form followed by polymerization. Using the monomer or monomers and the necessary cellulose ester of a monobasic organic acid, the process steps required involve impregnation of the cellulose ester in the desired shape with the polymerizable monomer or monomers involved, by any of the known methods whether vapor or liquid impregnation, subjecting the impregnated object to polymerizing conditions for said monomer, whereby the polymer is obtained predominantly within and unextractable from the cellulose ester, regenerating the cellulose by saponification of the cellulose ester, and finally treating the regenerated cellulose/addition polymer blend with a solvent for the added addition polymer. Readier saponification of the cellulose ester and therefore regeneration of the cellulose is achieved if, prior to the saponification stage, i. e., just after the addition polymer has been formed by polymerization, the thus polymer-coated and internally-deposited, polymer-modified cellulose ester object is treated with a solvent for the addition polymer so as to largely remove from the surface of the thus-modified object the surface polymer, thereby leaving only the inextractable, internally deposited addition polymer.

Using the preformed, waterproof, addition polymer or polymers desired and the necessary cellulose ester of a monobasic organic acid, the process steps required to obtain the polymer predominantly internal to the cellulose ester and predominantly inextractable therefrom involve mixing or blending, conveniently in solution, the cellulose ester with the preformed addition polymer or polymers being used, shaping the resultant blend into the desired form, regenerating the cellulose by saponification of the cellulose ester, and, finally, treating the regenerated cellulose/addition polymer blend with a solvent for the added addition polymer. Impregnating a cellulose ester shaped object with a preformed polymer does not give the required predominantly internal inclusion within, coextensive with, and unextractable from, the cellulose ester but rather places the polymer on the outside of the cellulose ester.

The last step in both processes is critical in the preparation of these products. At all other stages of both processes, the modified cellulose ester or regenerated cellulose is substantially completely indistiguishable from corresponding unmodified products. It is not until the modified, regenerated cellulose shaped object is treated with a solvent for the waterproof addition polymer that the surprising property differences of these new products appear. Furthermore, it is necessary that the cellulose be regenerated, and more specifically that it be regenerated by saponification of a cellulose ester of a monobasic organic acid. Thus, the products of this invention cannot be obtained by either of the above routes using cellulose, whether native or regenerated, or even other cellulose precursors, e. g., cellulose xanthate.

While the invention is generic to the saponification, as above described, of a shaped object of a cellulose ester of a 1–6 carbon alkanoic acid, in intimate admixture with a predominantly internally deposited waterproof addition polymer inert to the saponification conditions and the subsequent treatment of the regenerated cellulose/addition polymer shaped object with a solvent for the addition polymer, it is preferred for reasons of convenience, economy, and availability to treat a shaped object of a cellulose ester of a lower (1–6 carbon) alkanoic acid intimately admixed with a predominantly internally deposited waterproof vinylidene polymer, resistant to saponification, of the class of vinyl hydrocarbon polymers; halogenated vinyl hydrocarbon polymers, whether obtained by halogenation of hydrocarbon or halogenated hydrocarbon polymers or by polymerization of halogenated hydrocarbon monomers; and the alkali resistant, i. e., saponification resistant, alpha-substituted acrylic acid type polymers, e. g., the nitriles such as methacrylonitrile, etc., the esters, such as ethyl methacrylate, methyl alpha-chloroacrylate, etc.

The following examples in which parts are by weight are illustrative of the invention.

EXAMPLE 1

A 0.756 part skein of commercial cellulose acetate yarn (containing approximately 2.5 acetyl groups per glucose unit) is immersed at room temperature in a solution of 10 parts of styrene and 0.3 part of $\alpha,\alpha'$-azodiisobutyronitrile in 10 parts of redistilled xylene, held for two hours at this temperature, and the whole then heated at 70° C. for 21 hours to effect polymerization. The yarn is then removed from the polymerization bath and washed thoroughly with xylene at 100° C. to remove surface polymer. To insure complete removal, the yarn is further washed with benzene and finally with hot water to assist in removing absorbed hydrocarbon solvent. After vacuum drying at 70° C., there is thus obtained 1.176 parts of a 64/36 cellulose acetate/polystyrene blend (55.5% polystyrene based on cellulose acetate) in yarn form with the polystyrene wholly internally deposited and substantially completely inextractable. The thus-modified yarn exhibits no noticeable difference in physical or esthetic properties from the original cellulose acetate yarn.

The dried modified yarn is saponified by heating for 30 minutes at 45° C. in a solution of one part of sodium methoxide in 200 parts of methanol, washed alkali-free with hot water, and dried. There is thus obtained a 0.879 part skein of polystyrene modified, regenerated cellulose yarn containing about 85% polystyrene based on cellulose and exhibiting substantially the same physical and esthetic properties, i. e., hand and feel, as comparable unmodified regenerated cellulose yarn. The modified yarn is about as hydrophilic as unmodified cellulose or unmodified regenerated cellulose; for instance, the yarn when immersed in water becomes thoroughly wet in about five minutes.

The dried modified yarn is then immersed in benzene for five minutes at the boiling point and dried. There is thus obtained, with about 1% weight loss, a 54/46 cellulose/polystyrene blend in yarn form containing the majority of the polystyrene enmeshed within the cellulose structure and substantially inextractable therefrom, and on most of the surface of said yarn a minor amount of the polystyrene in a thin layer, said polystyrene layer being attached through polystyrene chains to the internally deposited polystyrene and being likewise substantially inextractable from the cellulose (only about 0.7% of the polystyrene removed after 70 hours extraction with benzene).

This new product exhibits substantially the same physical and esthetic properties as unmodified regenerated cellulose yarn but is extremely hydrophobic and will float on a water surface indefinitely in contrast to the rapid wetting-out (about five minutes or less) for unmodified cellulose or regenerated cellulose yarn. Furthermore, this modified yarn will support greater than its own weight in water for about three weeks before wetting-out and subsequent sinking. Even more surprising, this finally wet-out sample upon being thoroughly dried shows substantially no difference in hydrophilicity from comparable unmodified cellulose yarn and yet this once wet-out then dried yarn sample upon simple immersion again in benzene for five minutes at the boiling point and drying exhibits again the initial extreme hydrophobicity described above. This process can be carried out apparently indefinitely, all that is necessary to regain the high liquid water resistance of the new modified products of this invention being a simple short treatment with a solvent for the modifying hydrophobic polymer.

Another similar experiment using 4.18 parts of cellulose acetate yarn, a solution of 50 parts of styrene and 0.1 part of $\alpha,\alpha'$-azodiisobutyronitrile in 50 parts of xylene, and a polymerization cycle of 20 hours at 65–70° C. resulted, after thorough benzene extraction and drying, in the formation of 9.27 parts of modified cellulose acetate yarn containing 122% (based on the cellulose acetate) wholly internally deposited polystyrene. After saponification and treatment with benzene as above, there was obtained a hydrophobic 35/65 regenerated cellulose/polystyrene blend (189% polystyrene based on cellulose) in yarn form exhibiting essentially the same or better physical properties as the regenerated cellulose acetate control yarn or the non-developed, polystyrene modified, regenerated cellulose acetate control yarn as shown by the data in the following table:

Table

| | Regenerated Cellulose Acetate Control | Polystyrene Modified Regenerated Cellulose Acetate Control | Same, Developed, i. e., Treated With Benzene |
|---|---|---|---|
| Denier | 92 | 194 | 194. |
| Break strength in grams: | | | |
| Dry | 92 | 120 | 132. |
| Wet | 47 | 45 | 50. |
| Loop | 88 | 123 | 124. |
| Modulus: | | | |
| Dry | 35.5 | 25.7 | 31.9. |
| Wet | 2.2 | 5.8 | 8.4. |
| Work recovery in percent from stretch of: | | | |
| 1% | 34.4 | 57.5 | 58.5. |
| 3% | 11.8 | 21.1 | 19.8. |
| 5% | 9.4 | 12.0 | 11.7. |
| Moisture regain in percent based on cellulose | 39.8 | 46.0 | 41.7. |
| Time to sink when totally immersed in $H_2O$ | 1–5 minutes | 1–5 minutes | about 21 days. |

EXAMPLE II

A 1.321 parts skein of the cellulose acetate yarn of Example I is immersed in a solution of 5 parts of methyl methacrylate and 0.05 part of $\alpha,\alpha'$-azodiisobutyronitrile in 25 parts of freshly redistilled xylene and the whole heated in a closed reactor under autogenous pressure for 15 hours at 70° C. The reactor is then cooled, vented to the atmosphere, and the yarn skein removed from the polymer solution and washed thoroughly with excess xylene and benzene to remove all surface polymethyl methacrylate. After drying under reduced pressure at 70°, there is thus obtained a 1.542 parts skein of modified cellulose acetate yarn containing 16.7% (based on cellulose acetate) of wholly internally deposited and substantially completely inextractable polymethyl methacrylate, i. e., an 86/14 cellulose acetate/polymethyl methacrylate blend. The modified yarn exhibits essentially no differences in physical or esthetic properties from unmodified cellulose acetate yarn.

The modified yearn is saponified by heating for one hour at 45° C. in a 0.5% solution of sodium methoxide in methanol, washed alkali-free with water, and dried. There is thus obtained a 1.016 part skein of polymethyl methacrylate modified regenerated cellulose yarn containing 22.1% polymethyl methacrylate based on the cellulose and exhibiting essentially the same physical and esthetic properties as comparable unmodified cellulose yarn.

The dried modified yarn is then immersed for ten minutes in hot benzene and dried. There is thus obtained, with about 1% weight loss, an 82/18 cellulose/polymethyl methacrylate blend in yarn form containing the majority of the polymethyl methacrylate enmeshed within the cellulose structure and substantially inextractable therefrom, and on most of the surface of said yarn a minor amount of the polymethyl methacrylate in a thin layer, said polymethyl methacrylate layer being attached through the polymethyl methacrylate chain to the internally deposited polymethyl methacrylate and being likewise substantially inextractable from the cellulose (about 0.7% of the polymethyl methacrylate removed after 70 hours extraction with benzene).

Like the product of Example I this new polymethyl methacrylate modified regenerated cellulose yarn is extremely hydrophobic and resists liquid water immersion for about three weeks before becoming water-logged in contrast to almost immediate wetting-out of unmodified cellulose or regenerated cellulose yarns. Such properties are all the more surprising since the modified yarn exhibits substantially the same physical and esthetic properties as comparable unmodified regenerated cellulose yarn. Again, as in Example I, the hydrophobicity of the modified yarn can be easily regenerated after ultimate wetting-out by short exposure to a solvent for the modifying hydrophobic vinylidene polymer, i. e., in this specific case, polymethyl methacrylate.

An exactly similar experiment varying only in that 10 parts of monomeric methyl methacrylate is used in the initial step gives a polymethyl methacrylate modified regenerated cellulose yarn, exhibiting substantially the same properties but containing 63% polymethyl methacrylate based on cellulose, i. e., a 61/39 celllulose/polymethyl methacrylate blend.

EXAMPLE III

A 5.277 parts piece of commercial cellulose acetate taffeta fabric woven from essentially the same type yarn as in Example I is stretched on a stainless steel frame and immersed in a solution of 250 parts of styrene and one part of α,α'-azodiisobutyronitrile in 250 parts of xylene and the whole heated for 27.5 hours at 70° C. to effect polymerization. The treated fabric is then washed thoroughly with xylene at 100° C. to remove surface polystyrene, rinsed with benzene, and finally dried under vacuum at 70° C. There is thus obtained 7.884 parts of modified cellulose acetate fabric containing 49.5%, based on the original fabric, wholly internally deposited and substantially completely inextractable polystyrene. The fabric is essentially identical in all physical and esthetic properties with the original cellulose acetate fabric, especially, it is to be noted, in exhibiting the same high hydrophilicity.

The treated fabric is saponified by heating at 45° C. for 45 minutes in a solution of 1.5 parts of sodium methoxide in methanol, washed alkali-free with water, and dried. There is thus obtained a 5.863 parts piece of polystyrene modified, regenerated cellulose fabric containing 76.7% polystyrene based on cellulose (i. e., 57/43 regenerated cellulose/polystyrene blend) and exhibiting substantially the same physical and esthetic properties, e. g., hand, feel, and drape, as a comparable unmodified regenerated cellulose fabric, particularly in being about as hydrophilic.

The dried modified fabric is then immersed in xylene for 15 minutes at 100° C. and subsequently dried. The resultant modified fabric composed of regenerated cellulose yarn, with the modifying polystyrene distributed as described in detail in Example I, exhibits substantially the same physical and esthetic properties as a comparable unmodified, regenerated cellulose fabric. Like the yarn of Example I the modified fabric product is extremely and surprisingly hydrophobic. Drops of water placed on this fabric remain until they evaporate with no sign of any absorption by the fabric and no indication of the transpiration of any liquid water through the fabric.

The fabric is water-repellent in the conventional sense to a medium degree as indicated by spray-ratings of about 50 in conventionally used spray-rating tests as per the method described in the year Book of the American Association of Textile Chemists and Colorists 23, 240-4 (1946). This test method has been developed in evaluations of conventional type water-repellent materials but is not properly adaptable to the entirely new type fabric of the present invention. Many materials which exhibit high spray ratings in this test and accordingly are conventionally thought of as acceptable materials for waterproofing uses, e. g., raincoats, also exhibit quite appreciable strike-through, that is, direct transmission of liquid water during the spray-rating test. Such strike-through is most undesirable for any use such as in raincoats. In contrast to such behavior, the polystyrene modified, regenerated cellulose fabric of this example exhibits no strike-through whatever. In fact, this material is so effective a bar to liquid water through-put that a sample of a similar polystyrene modified fabric sealed with beeswax to a glass cylinder supports vertically a two-inch column of water in the cylinder with no through-put of water at all.

EXAMPLE IV

Eighty parts of commercial cellulose acetate flake (containing about 2.44 acetyl groups per glucose unit) and 20 parts of commercial polymethyl methacrylate are added to 300 parts of peroxide-free dioxane and the resulting mixture heated under reflux for six hours at 70° C. with stirring, and then let stand unheated for about an additional 16 hours. The clear solution of the 80/20 cellulose acetate/polymethyl methacrylate blend thus obtained (viscosity about 290 poises at 90° C.) is dry-spun using typical cellulose acetate spinning equipment through a 5-hole spinneret (hole diameter 0.1 mm.) at a spinneret temperature of 100° C. and a column temperature of 145° C. for solvent removal. A skein (1.202 parts) of the resultant 80/20 cellulose acetate/polymethyl methacrylate yarn is saponified by heating at 45° C. for 30 minutes in a 0.5% solution of sodium methoxide in methanol, washed alkali-free with water, and dried. There is thus obtained a 0.842 part skein of a 74/26 regenerated cellulose/polymethyl methacrylate blend exhibiting essentially the same physical and esthetic properties as a comparable regenerated cellulose yarn, e. g., good hydrophilicity.

The dried blend yarn is immersed in boiling benzene for 10 minutes and then air-dried. There is thus obtained (with about 1% weight loss) a 74/26 cellulose/polymethyl methacrylate blend in yarn form containing the majority of the polymethyl methacrylate entrapped and enmeshed in the cellulose structure and substantially inextractable therefrom and on the greater part of the surface of said yarn a minor amount of the total polymethyl methacrylate in a thin layer attached through polymethyl methacrylate chains to the internally trapped polymethyl methacrylate and likewise substantially inextractable from the cellulose (only about 1.7% more polymethyl methacrylate removed after 88 hours extraction in benzene).

This polymethyl methacrylate modified, regenerated cellulose yarn is substantially identical in general, physical and esthetic properties to the polymethyl methacrylate modified cellulose yarn of Example II obtained from cellulose acetate and monomeric methyl methacrylate. Like the modified yarn of Example II, the present yarn is also substantially unchanged in such properties from comparable unmodified cellulose yarn and at the same time exhibits substantially the same or greater extreme hydrophobicity of the modified yarn of Example II since it resists liquid water attack on being completely immersed in water for as much as 36 days before becoming wet-out. As is the case with the yarn of Example II, the hydrophobicity of the modified yarn of this example once lost by long term water exposure can be simply regained unchanged in magnitude by short exposure, e. g., 5–10 minutes, to a solvent, preferably at elevated temperatures, for the modifying hydrophobic polymethyl methacrylate.

EXAMPLE V

Eighty-four parts of commercial cellulose acetate flake, as in Example IV, and 28.1 parts of commercial chlorinated rubber are dissolved in 300 parts of peroxide-free dioxane and the resulting clear solution of the 75/25 cellulose acetate/chlorinated rubber blend (viscosity about 400 poises at 90° C.) is dry-spun using conventional techniques, all as given in Example IV. A skein (1.050 parts) of the resultant modified cellulose acetate yarn is saponified by heating at 45° C. for 30 minutes in a 0.5% solution of sodium methoxide in methanol, washed alkali-free with water and dried. There is thus obtained a 0.741 part yarn skein of a 69/31 regenerated cellulose/chlorinated rubber blend exhibiting essentially the same physical and esthetic properties as a comparable cellulose yarn, particularly in hydrophilicity.

The dried blend yarn is immersed in boiling benzene for 10 minutes and then air-dried. There is thus obtained a modified regenerated cellulose yarn comparable in structure to that described in Example IV with chlorinated rubber in place of the polymethyl methacrylate. The solvent-treated yarn, while still exhibiting substantially the same physical and esthetic properties as unmodified, regenerated cellulose yarn, is extremely hydrophobic and resists liquid water attack when completely immersed for 21 days before wetting-out. The hydrophobic character of the modified but wet yarn can be easily regenerated by simply air-drying and immersing in boiling xylene for 10 minutes. Actually, the hydrophobic character of the xylene-treated yarn is improved since it floats in water for 41 days before wetting-out. This is possibly traceable to the readier solubility of chlorinated rubber in xylene.

The unique products of this invention can be equally well prepared by shaping the desired object from a homogeneous blend of one or more monobasic, organic acid esters of cellulose and one or more preformed waterproof, non-saponifiable, addition polymers, or by internally impregnating a preformed shaped object of one or more cellulose esters of monobasic organic acids with the corresponding addition polymerizable monomer or monomers and effecting polymerization thereof in situ in and on the preformed shaped cellulose ester object, followed in both instances by saponification to regenerate the cellulose and subsequent treatment with a solvent for the addition polymer which is not a solvent or swelling agent for the regenerated cellulose. Such non-saponifiable, waterproof or hydrophobic addition polymers and copolymers and the monomers from which such polymers are prepared are well known in the polymer art, as is also their behavior upon exposure to saponifying conditions. A convenient method of characterizing these waterproof polymers lies in their water absorption, as measured by the ASTM standard procedure D-570. In this test, the waterproof polymers for the purposes of this invention are those which exhibit a maximum water absorption of 1% by weight or less, and preferably 0.5% by weight or less. These polymers, for the purposes of this invention, are also not saponified under the relatively mild conditions suitable for the saponification of the cellulose esters, which conditions are equally well known in the art. Thus, these polymers are at least not saponified by heating small particles thereof, e. g., granules, for one hour at 45° C. in a 0.5% solution of sodium methoxide in methanol.

The polymers are those of ethylenically unsaturated addition polymerizable monomers including the solely hydrocarbon monoethylenically unsaturated monomers, e. g., ethylene, the solely hydrocarbon polyethylenically unsaturated addition polymerizable monomers, e. g., butadiene, and the hydrocarbon and negatively substituted derivatives of both classes, e. g., acrylonitrile, tetrafluoroethylene, styrene, isoprene, chloroprene, and the like. The preferred ethylenically unsaturated addition polymerizable monomers are those containing a single non-aromatic carbon to carbon unsaturation and that an ethylenic group, preferably in a terminal position, i. e., the vinylidene monomers containing a single $CH_2=C<$ group. These result in essentially saturated polymers. Especially preferred amongst these vinylidene monomers are those wherein at least one of the indicated free valences of the said single vinylidene group is bonded directly to a negative group which is not saponifiable under the mild hydrolysis conditions necessary for regenerating cellulose from an organic acid ester of cellulose. Suitable specific examples of this preferred type include the vinylidene halides, such as vinylidene chloride, vinyl chloride, vinyl fluoride, and the like; the vinyl aryls, e. g., styrene, α-methylstyrene, and the like; vinylidene carboxylates in which the vinylidene group is in the acid portion of the ester, e. g., methyl methacrylate, ethyl methacrylate, ethyl chloroacrylate, and the like.

In those instances wherein the preformed nonsaponifiable, waterproof, addition polymer is used, modified polymers and copolymers of the above described monomers can also be used. Thus, chlorinated polyethylene, chlorinated polyvinyl chloride, chlorinated polyvinylidene chloride, chlorinated rubber, and the like are within the purview of this invention. Obviously, mixtures of both monomers and polymers can also be used in which instances the modifying hydrophobic polymer will be, respectively, a copolymer or a blend of polymers or copolymers.

In preparing the new products of this invention using the above-described monomers, the cellulose ester in any desired shape is usually impregnated with the monomer in aqueous dispersion or in solution in any organic solvent for the monomers being used, which may or may not be a solvent for the resultant polymer but which is not a solvent for the cellulose ester. Any organic solvent, either alone or in admixture, and in certain cases diluted with water, can be used provided it is unreactive with the monomer and the cellulose ester being used and non-solvent for the latter. To name but a few representative classes such solvents as the liquid aliphatic aromatic cycloaliphatic, alkaromatic, and araliphatic hydrocarbons, halogenated hydrocarbons, alcohols, ethers, and the like, can be used alone or in admixture, depending largely on the monomers involved, as will be apparent to those skilled in this polymer art. Suitable specific examples include the heptanes, cyclohexane, the xylenes, benzene, carbon tetrachloride, chlorobenzene, propanol, dibutyl ether, and the like.

Generally the aqueous dispersion or organic solution of the monomer or monomers being used will also contain added small quantities of one or more free radical generating polymerization initiators for the ethylenically unsaturated addition polymerizable monomers. Suitable illustrative classes of these initiators include the oxygen-generating free radical type polymerization initiators, e. g., the hydroperoxides and peroxides, such as hydrogen peroxide itself, benzoyl peroxide, lauroyl peroxide, diethyl peroxide, etc. and the azo-type free radical generating polymerization initiators, such as the azonitriles and derivatives thereof, e. g., $\alpha,\alpha'$-azobis($\alpha,\gamma$-dimethylvaleronitrile), $\alpha,\alpha'$ - azobis(isobutyramidine hydrochloride), etc.

The impregnation step is generally carried out at temperatures ranging from 0 to about 100° C., and more usually at temperatures in the range of room temperature. The polymerization step is generally carried out at slightly elevated temperatures, ranging from 25 to about 100–110° C. and more usually in the range of about 40 to 80° C. At the higher temperatures or with the more volatile monomers, it is generally preferably to carry out this step in a closed reaction vessel.

The choice of polymerization initiator, the concentration thereof, the temperature of impregnation, the temperature of polymerization, the solvent or dispersant system used, are all interrelated variables, largely depending upon the particular monomer or monomer mixture being used and the selection of the optimum conditions is within the skill of the chemist. These interdependent variables and the preferred conditions will be apparent to those skilled in the polymer art.

In those instances wherein the modifying water-proof addition polymer is used in its preformed polymeric form, the cellulose ester or esters and the polymer, including copolymer or polymer mixtures, being used are conveniently blended together in solution in a common solvent or solvent mixture, and the resultant blend then shaped into the desired form. The solvents used are well known in the polymer art, and are simply those that are unreactive with and will dissolve the cellulose ester and/or the modifying waterproof polymer. In general, because of the desirable solubility properties they possess for the cellulose esters, it is preferred to use the aliphatic and cycloaliphatic ketones, esters, and amides, especially the lower alkyl or cycloalkyl ketones, carboxamides, alkanoates, and cyclic ethers, alone or in admixture together or with other liquid media. Suitable specific examples of these include, for example, acetone, cyclohexanone, dimethylformamide, ethyl acetate, and dioxane. Certain halogenated lower aliphatic hydrocarbons having two or more halogens per carbon are also useful, alone or in admixture together or with other liquid media. Suitable specific examples include methylene chloride and/or chlorofrom/lower alkanol mixtures, etc. Frequently, it is desirable because of the respective solubility properties of both the cellulose ester and the preformed waterproof addition polymer or polymers to use solvent blends, i. e., compatible blends of organic solvents of high solubility power for each or both of the components of the blends, e. g., a blend of acetone and benzene for a cellulose acetate/polystyrene blend. The shaping step is likewise well known in the art, and for instance in the formation of fibers, will be usually the dry-spinning method practiced commercially for many of the cellulose esters.

Any cellulose ester of a monobasic organic acid, and particularly any monocarboxylic acid ester of cellulose wherein at least two hydroxyl groups of each glucose unit are esterified, can be used alone or in admixture with one or more such esters, including cellulose esters of the alkanoic acids, e. g., cellulose formate, cellulose butyrate, cellulose propionate, cellulose hexanoate, and the like, in addition to the above specifically exemplified cellulose acetate; also included are the mixed binary and ternary cellulose esters of the various acids such as cellulose acetate/butyrate, cellulose acetate/propionate, cellulose acetate/propionate/butyrate. Such esters and their properties are now well documented in the art and a complete discussion of them is found in Ott's "Cellulose and Cellulose Derivatives," High Polymers, volume V, edited by Ott, Interscience, 1943, particularly in chapter VIII, p. 667 et seq. The preferred cellulose esters, because of readier availability and lower cost are the cellulose esters of the monobasic lower aliphatic carboxylic acids, that is, the lower alkanoate esters wherein the alkanoic acid portion contains from 1 to 6 carbons. The particular acyl function in the cellulose ester structure is of little or no importance relative to the new products of this invention, providing a shaped object of a blend of cellulose ester of a monobasic organic, and preferably monocarboxylic, acid and a waterproof addition polymer wherein the said waterproof polymer is predominantly internally deposited within the cellulose ester and predominantly unextractable therefrom, is obtained prior to regeneration of the cellulose.

The products of this invention are surprisingly and fundamentally different in properties from shaped objects of a blend of regenerated cellulose and a waterproof addition polymer wherein the addition polymer is predominantly internally deposited within the shaped object when said objects are prepared from a preformed, regenerated cellulose shaped object blended with the waterproof addition polymer, either preformed or polymerized in situ. Thus, a viscose rayon yarn skein containing even as high as 106% by weight wholly internally deposited polystyrene [prepared in the manner of Landells and Whewell (J. Soc. Dyers Colourists 67, 338 (1951) from a preformed, regenerated viscose rayon yarn], when immersed in liquid water, begins to wet-out noticeably in as short a time as 10 minutes. In contrast, as given in detal in the foregoing Example I, a regenerated cellulose yarn prepared by the process of this invention and containing about 85% substantially internally deposited polystyrene does not wet-out in contact with liquid water for periods up to about three weeks. The latter product of this invention was prepared by regeneration of cellulose in a shaped object prepared from a blend of substantially wholly internally deposited polystyrene and cellulose acetate. The criticality and specificity of the present invention is thus readily apparent. The regeneration of the cellulose must be carried out after the shaped object is prepared from the cellulose monobasic carboxylic acid ester/waterproof addition polymer blend and the thus regenerated shaped object must be developed by treatment with a solvent for the waterproof addition polymer.

The saponification of the cellulose ester of a monobasic organic acid in the blend, i. e., the regeneration of the cellulose therein, is carried out by any of the known procedures. The cellulose ester can be saponified in aqueous or organic media provided there is present appreciable proportions of a strong inorganic base. For instance, the cellulose esters can easily be regenerated to cellulose using aqueous systems containing from 1 to 50% or higher added strong inorganic bases, e. g., the alkali metal hydroxides. The cellulose esters can equally well be regenerated in non-solvent organic systems using from as little as 0.5 to as much as 25% added, strong, organic soluble alkaline agents, e. g., the alkali metal alkoxides, and the like. Since a wider spectrum of hydrophobic polymers can be used including those which are saponified to hydrophilic polymers under more vigorous conditions, the preferred conditions for regenerating the cellulose are the mildest that can be found. Generally these involve regeneration in an alkaline organic system containing no more than about 5% of the alkaline agent at temperatures in the range 25–90° C. A convenient method is to carry out the saponification in an alcohol system containing the desired concentration of a dissolved alkali metal in which case the active alkaline saponifying agent is the corresponding alkali metal alkoxide.

Time and temperature, as is true of all other chemical reactions, are interdependent variables in the saponification step. Shorter times will be used at the higher temperature and longer times at the lower. Generally speaking, in the preferred range of temperature, i. e., 25–90° C., and generally at about 50° C., saponification times of up to a few hours, e. g., but six hours, will suffice and usually very little is gained in completeness of saponification by carrying the reaction out for appreciably longer than 30 minutes to one hour.

Another interdependent variable relative to the saponification conditions used hinges on the degree of known saponifiability of the waterproof addition polymer used. For instance, in the case of the wholly hydrocarbon waterproof addition polymers such as polystyrene, the saponification conditions can be made as rigorous as desired since this particular class of waterproof addition polymer is not saponifiable. On the other hand, when the α-substituted acrylic acid ester polymers are used, e. g., polymethyl methacrylate, polymethyl chloroacrylate, and the like, the most rigorous saponification conditions are to be avoided since these polymers, if the conditions are rigorous enough, can be saponified, for instance, using 50% aqueous alkali at high temperatures for long periods of time. However, these properties of the waterproof addition polymers are well known to those skilled in the polymer art and such extremely rigorous saponification conditions would not be normally used in the regeneration of a cellulose from a cellulose monobasic organic ester thereof.

After the saponification of the cellulose monobasic organic acid ester/non-saponifiable waterproof addition polymer composition, all that is necessary to produce the new products of this invention is a simple treatment with a solvent for the waterproof polymer, which obviously should not be a solvent or swelling agent for the regenerated cellulose. Solvents for the various types of waterproof polymers used are well known in the art and suitable specific types and specific compounds have already been mentioned. This development step can be easily carried out by simply immersing the shaped object of the regenerated cellulose/waterproof addition polymer blend in a bath of the solvent or solvent mixture being used. Alternatively, the step can be carried out by contacting the regenerated cellulose/waterproof polymer composition with the vapors of the solvent being used. Generally, this development step is carried out at temperatures ranging from room temperature to about 100–150° C. and most conveniently is carried out by immersing the modified regenerated cellulose article in a bath of the solvent at the boil. Contact times need not be long and generally range from one minute to about one hour, 5–10 minutes at the boil usually being sufficient. The time and temperature are interdependent variables and vary with the specific nature of the polymer and solvent being used.

Similar treatments after the new waterproof products of this invention ultimately become water-logged serve to regenerate completely their initial waterproof character. This has been illustrated specifically in the foregoing examples.

The products of this invention are useful in the formation of tarpaulins, tents, ropes, and the like where their resistance to liquid water is obviously desirable. These new products are probably most useful in the field of protective outer garments, particularly raincoats, shower coats, umbrella fabric, all-weather jackets, and the like. In such uses they are ideal in that they do not permit the passage of any liquid water at all and at the same time retain the desirable physical and esthetic properties of unmodified regenerated cellulose, e. g., in being breatheable.

The following material is made of record in this application:

UNITED STATES PATENTS 1,902,257
1,930,229
1,975,959
2,067,706
2,085,513
2,128,612
2,284,839
2,337,398
2,402,942
2,406,412
2,406,453
2,406,454
2,542,771

BRITISH PATENTS 308,658
311,784
431,191
454,923
562,184
570,883

FRENCH PATENTS 839,218
913,935

JOURNAL REFERENCES

Staudinger and Dohle, J. prakt. chem. [2] 161, 219–40 (1942).

Landells & Whewell, J. Soc. Dyers Colourists 67, 338–45 (1951).

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of a waterproof yarn of regenerated cellulose having at least as good hand and feel as an unmodified cellulose yarn which comprises (1) substantially completely saponifying the cellulose acetate of a cellulose acetate yarn containing, in intimate admixture therewith, and predominately within and coextensive with the cellulose acetate and essentially inert to the saponification conditions, 20–200% by weight of the cellulose, of polymethyl methacrylate until the cellulose acetate is completely saponified to cellulose, thereby producing a non-waterproof cellulose yarn containing about 20–200% by weight, based on the weight of the cellulose, of polymethyl methacrylate, substantially unextractable therefrom, and (2) washing the resultant saponified yarn with an organic solvent for polymethyl methacrylate, which solvent is inert to the cellulose, until any extractable polymer is removed and waterproof yarn of regenerated cellulose containing unextractable polymethyl methacrylate is produced.

2. The process for the preparation of a waterproof regenerated cellulose shaped object in the form of film, fabric, or filament, which shaped object is waterproof but at the same time is at least as good as unmodified cellulose in esthetic properties such as hand, feel, and drape, which comprises (1) substantially completely saponifying the cellulose acetate of a so-shaped object of an intimate admixture of cellulose acetate and 20–200%, by weight of the cellulose, of polymethyl methacrylate, said polymer being predominately within and coextensive with the cellulose acetate and essentially inert to the saponification conditions, until the cellulose acetate is substantially completely saponified, thereby producing a nonwaterproof object of regenerated cellulose containing about 20–200% by weight, based on the weight of the cellulose, of polymethyl methacrylate, substantially unextractable therefrom, and (2) washing the resultant saponified shaped object with an organic solvent for polymethyl methacrylate, which solvent is inert to the cellulose, until any extractable polymer is removed and a waterproof object of regenerated cellulose containing unextractable polymethyl methacrylate is produced.

3. The process for the preparation of a waterproof regenerated cellulose shaped object in the form of film, fabric, or filament, which shaped object is waterproof but at the same time is at least as good as unmodified cellulose in esthetic properties such as hand, feel, and drape, which comprises (1) substantially completely saponifying the cellulose acetate of a so-shaped object of an intimate admixture of cellulose acetate and 20–200%, by weight of the cellulose, of polystyrene, said polystyrene being predominantly within and coextensive with the cellulose acetate and essentially inert to the saponification conditions, until the cellulose acetate is substantially completely saponified, thereby producing a nonwaterproof object of regenerated cellulose containing about 20–200% by weight, based on the weight of the cellulose, of polystyrene, substantially unextractable therefrom, and (2) washing the resultant saponified shaped object with an organic solvent for polystyrene, which solvent is inert to the cellulose, until any extractable polymer is removed and a waterproof shape of regenerated cellulose containing unextractable polystyrene is produced.

4. The process for the preparation of a waterproof regenerated cellulose shaped object in the form of film, fabric, or filament, which shaped object is waterproof but at the same time is at least as good as unmodified cellulose in esthetic properties such as hand, feel, and drape, which comprises (1) substantially completely saponifying the cellulose acetate of a so-shaped object of an intimate admixture of cellulose acetate and 20–200%, by weight of the cellulose, of a waterproof addition polymer, said polymer being predominantly within and coextensive with the cellulose acetate and essentially inert to the saponification conditions, until the cellulose acetate is substantially completely saponified, thereby producing a nonwaterproof object of regenerated cellulose containing about 20–200% by weight, based on the weight of the cellulose, of said waterproof addition polymer substantially unextractable therefrom, and (2) washing the resultant saponified shaped object with an organic solvent for the waterproof addition polymer, which solvent is inert to the cellulose, until any extractable polymer is removed and a waterproof object of regenerated cellulose containing unextractable addition polymer is produced.

5. The process for the preparation of a waterproof regenerated cellulose shaped object in the form of film, fabric, or filament, which shaped object is waterproof but at the same time is at least as good as unmodified cellulose in esthetic properties such as hand, feel, and drape, which comprises (1) substantially completely saponifying the cellulose ester of a so-shaped object of an intimate admixture of a cellulose ester of a 1 to 6 carbon alkanoic acid and, predominantly within and coextensive with the cellulose ester, 20–200%, by weight of the cellulose, of a waterproof addition polymer inert to the saponification conditions until the cellulose ester is substantially completely saponified, thereby producing a nonwaterproof object of regenerated cellulose containing about 20–200% by weight, based on the weight of the cellulose, of said waterproof addition polymer, substantially unextractable therefrom, and (2) washing the resultant saponified shaped object with an organic solvent for the waterproof addition polymer, which solvent is inert to the cellulose, until any extractable polymer is removed and a waterproof object of regenerated cellulose containing unextractable addition polymer is produced.

6. The process for the preparation of a waterproof regenerated cellulose shaped object in the form of film, fabric, or filament, which shaped object is waterproof but at the same time is at least as good as unmodified cellulose in esthetic properties such as hand, feel, and drape, which comprises (1) substantially completely saponifying the cellulose ester of a so-shaped object of an intimate admixture of a cellulose ester of a 1 to 6 carbon alkanoic acid and, predominantly within and coextensive with the cellulose ester, 20–200%, by weight of the cellulose, of a waterproof hydrocarbon addition polymer inert to the saponification conditions until the cellulose ester is substantially completely saponified, thereby producing a nonwaterproof object of regenerated cellulose containing about 20–200% by weight, based on the weight of the cellulose, of said waterproof hydrocarbon addition polymer substantially unextractable therefrom, and (2) washing the resultant saponified shaped object with an organic solvent for the addition polymer, which solvent is inert to the cellulose, until any extractable polymer is removed and a waterproof object of regenerated cellulose containing unextractable hydrocarbon addition polymer is produced.

7. The process for the preparation of a waterproof regenerated cellulose shaped object in the form of film, fabric, or filament which shaped object is waterproof but at the same time is at least as good as unmodified cellulose in esthetic properties such as hand, feel, and drape, which comprises (1) substantially completely saponifying the cellulose ester of a so-shaped object of an intimate admixture of a cellulose ester of a 1 to 6 carbon alkanoic acid and, predominantly within and coextensive with the cellulose ester, 20–200%, by weight of the cellulose, of a halogenated hydrocarbon addition polymer inert to the saponification conditions until the cellulose ester is substantially completely saponified, thereby producing a nonwaterproof object of regenerated cellulose containing about 20–200% by weight, based on the weight of the cellulose, of said halogenated hydrocarbon addition polymer substantially unextractable therefrom, and (2) washing the resultant saponified shaped object with an organic solvent for the addition polymer, which solvent is inert to the cellulose, until any extractable polymer is removed and a waterproof object containing unextractable halogenated hydrocarbon addition polymer is produced.

8. The process for the preparation of a waterproof regenerated cellulose shaped object in the form of film, fabric, or filament, which shaped object is waterproof but at the same time is at least as good as unmodified cellulose in esthetic properties such as hand, feel, and drape, which comprises (1) substantially completely saponifying the cellulose ester of a so-shaped object of an intimate admixture of a cellulose ester of a 1 to 6 carbon alkanoic acid and, predominantly within and coextensive with the cellulose ester, 20–200%, by weight of the cellulose, of a waterproof neutral α-substituted acrylic addition polymer inert to the saponification conditions until the cellulose ester is substantially completely saponified, thereby producing a nonwaterproof object of regenerated cellulose containing about 20–200% by weight, based on the weight of the cellulose, of said α-substituted acrylic addition polymer substantially unextractable therefrom, and (2) washing the resultant saponified shaped object with an organic solvent for the addition polymer, which solvent is inert to the cellulose, until any extractable polymer is removed and a waterproof object of regenerated cellulose containing unextractable addition polymer is produced.

9. Waterproof films, fabrics, and filaments of regenerated cellulose produced by the process of claim 5, having at least as good hand and feel as unmodified cellulose, and containing, in intimate admixture, predominantly therewithin, and coextensive therewith, 20–200%, by weight of the cellulose, of a waterproof addition polymer which is substantially completely unextractable therefrom.

10. Waterproof films, fabrics, and filaments of regenerated cellulose produced by the process of claim 6, having at least as good hand and feel as unmodified cellulose, and containing, in intimate admixture, predominantly therewithin, and coextensive therewith, 20–200%, by weight of the cellulose, of a waterproof hydrocarbon addition polymer which is substantially completely unextractable therefrom.

11. Waterproof films, fabrics, and filaments of regenerated cellulose produced by the process of claim 7, having at least as good hand and feel as unmodified cellulose, and containing, in intimate admixture, predominantly therewithin, and coextensive therewith, 20–200%, by weight of the cellulose, of a waterproof halogenated hydrocarbon addition polymer which is substantially completely unextractable therefrom.

12. Waterproof films, fabrics, and filaments of regenerated cellulose produced by the process of claim 8, having at least as good hand and feel as unmodified cellulose, and containing, in intimate admixture, predominantly therewithin, and coextensive therewith, 20–200%, by weight of the cellulose, of a waterproof neutral α-substituted acrylic addition polymer which is substantially completely unextractable therefrom.

13. The process for the preparation of a waterproof regenerated cellulose shaped object in the form of film, fabric, or filament, which shaped object is waterproof but at the same time is at least as good as unmodified cellulose in esthetic properties such as hand, feel, and drape, which comprises (1) substantially completely saponifying the cellulose ester of a so-shaped object of an intimate admixture of a cellulose ester of a 1 to 6 carbon alkanoic acid and, predominantly within and coextensive with the cellulose ester, 20–200%, by weight of the cellulose, of a waterproof addition polymer inert to the saponification conditions and selected from the class consisting of polystyrene, methyl methacrylate polymer, and chlorinated rubber until the cellulose ester is substantially completely saponified, thereby producing a nonwaterproof object of regenerated cellulose containing about 20–200% by weight, based on the weight of the cellulose, of said waterproof addition polymer substantially unextractable therefrom, and (2) washing the resultant saponified shaped object with an organic solvent for the addition polymer, which solvent is inert to the cellulose, until any extractable polymer is removed and a waterproof object of regenerated cellulose containing unextractable addition polymer is produced.

14. Waterproof films, fabrics, and filaments of regenerated cellulose produced by the process of claim 13, having at least as good hand and feel as unmodified cellulose, and containing, in intimate admixture, predominantly therewithin, and coextensive therewith, 20–200%, by weight of the cellulose, of a waterproof addition polymer which is substantially completely unextractable therefrom and is selected from the class consisting of polystyrene, methyl methacrylate polymers, and chlorinated rubber.

References Cited in the file of this patent
UNITED STATES PATENTS

| | | |
|---|---|---|
| 2,030,983 | Hagedorn et al. | Feb. 18, 1936 |
| 2,140,048 | Fikentscher | Dec. 13, 1938 |
| 2,246,070 | Schlack | June 17, 1941 |
| 2,261,294 | Schlack | Nov. 4, 1941 |
| 2,575,443 | Cornwell | Nov. 20, 1951 |
| 2,593,540 | Cornwell et al. | Apr. 22, 1952 |